Feb. 18, 1969  D. J. AMORUSO  3,427,918
MUSIC TEACHING DEVICE
Filed June 10, 1966  Sheet 1 of 2

INVENTOR.
DOMINIC J. AMORUSO

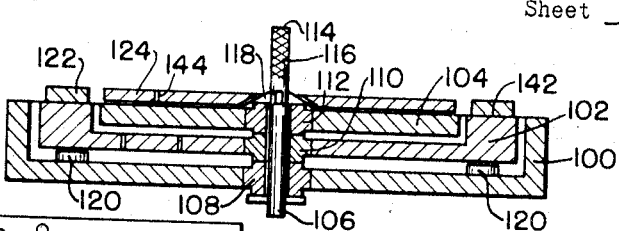
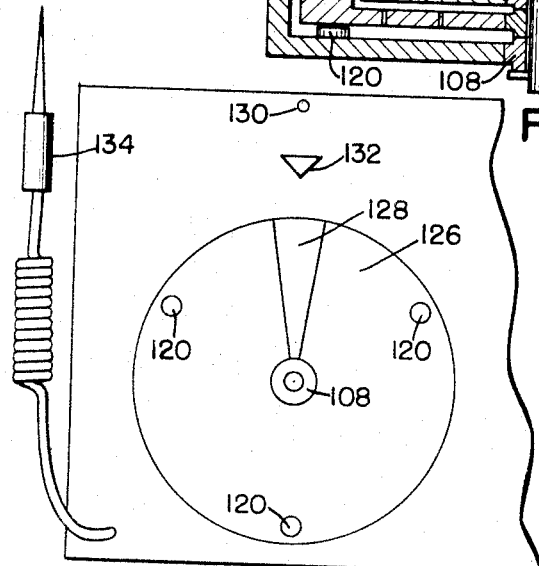
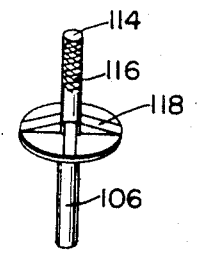
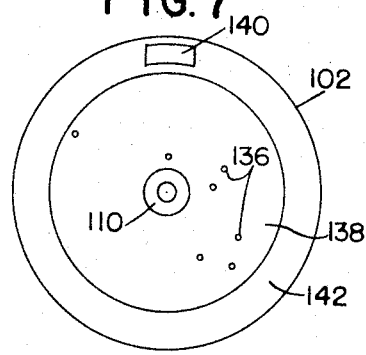
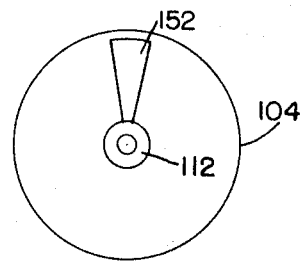
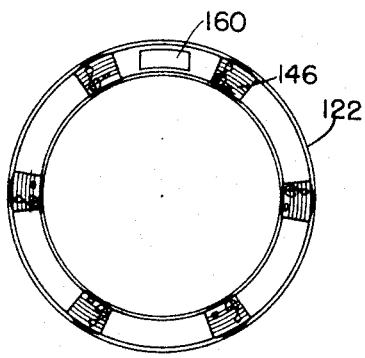
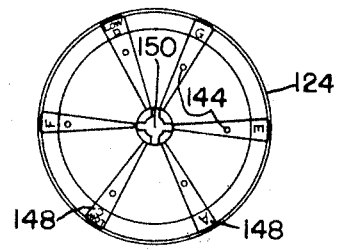
INVENTOR.
DOMINIC J. AMORUSO 3,427,918
MUSIC TEACHING DEVICE
Dominic John Amoruso, 35 Avola St.,
Arlington, Mass. 02174
Filed June 10, 1966, Ser. No. 556,736
U.S. Cl. 84—477
Int. Cl. G09b 15/02
6 Claims

ABSTRACT OF THE DISCLOSURE

A self-teaching device for music is composed of two circular elements, each rotatable with respect to each other, one of which overlaps the other. Each element contains information on the periphery thereof and is characterized by a plurality of spaced, cut-out portions which are so arranged, that when the proper information in one element is aligned with the corresponding information in the other, the cut-out portion will overlap and an electrical probe can be inserted into the cut-out portions to make contact with an underlying conductive circuit, actuating signal means indicating a correct answer. When the information is not properly aligned, the cut-out portions are not aligned and the probe cannot contact the conductive material.

My invention relates to a teaching device and more particularly concerns a music teaching device and/or game by which a user through matching the music information on rotatable elements may determine whether his selection is correct through a signalling means.

I am aware that others in the past have disclosed various devices in the form of musical charts comprising superimposed rotatable discs containing musical symbols, notes and instrument fingering. However, such musical charts have not been widely adopted nor used to help improve music reading nor to stimulate a user by employing the game approach of musical learning. These past musical charts have merely provided for the transposition of music information from one disc to the other. For example, the user merely reads from one disc the proper musical symbol corresponding to the musical notes selected on another disc.

It is an object of my invention to provide a teaching device designed to assist the user in learning with greater accuracy and stimulation than previous teaching devices.

Another object of my invention is to provide a music teaching device which provides a self-teaching means for learning music reading, proper fingering for musical instruments, as well as musical terms, musical symbols, chords, intervals and other music information.

A further object of my invention is to provide a music teaching device with a game approach by which the user is stimulated through such approach and thereby increases his rate and assimilation of knowledge and information.

Other objects and advantages of my invention will become apparent to those persons skilled in the art from the following description of my invention, together with the accompanying drawings wherein:

FIG. 6 is a vertical section taken along the line 6—6 of FIG. 5;

Figure 5:
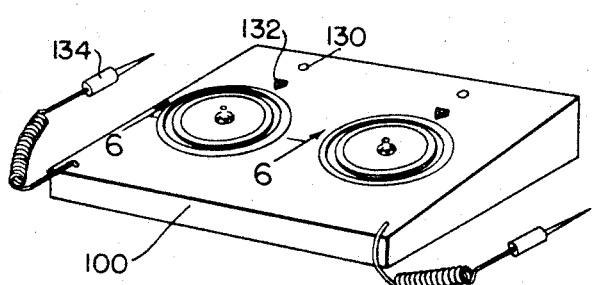
FIG. 5 is a perspective view of a music teaching aid device of my invention.

FIGS. 7 through 11 show plan views of various portions of the device of FIGS. 5 and 6; and FIG. 12 is a perspective view of a pivot pin used in the device shown in FIGS. 5 and 6.

My invention comprises in combination at least two information elements each of which is movable with respect to the other and each of which contains information which may be matched with one or more pieces of information on the other element. In one embodiment my information elements are circular discs which are rotatable with respect to each other about a common center, each disc containing thereon music information on its periphery which is matched by a user with the corresponding information on the other disc. Each information element is characterized by a plurality of small, spaced, cut-out portions therein, which are so arranged that when the proper information on one element is aligned say at a common reference point, with the corresponding correct information on the second element, the cut-out portions of each element will exactly correspond and overlap, but not otherwise overlap. My device includes a signal means by which the user may test whether he has correctly matched the information on the elements after moving one or both of the elements into position. My signalling means provides for a visual, audible, or other observable or responsive signal to be activated upon testing by the user as to whether the information elements have been properly aligned. For example, when employing two rotatable discs, the user would rotate each disc to a common reference point, and then test his selection of the matched information by the use of an elongated stylus in an electrical signalling circuit. The user inserts the pointed end of an electrically conductive stylus into and through the cut-out portions in the discs. Insertion of the stylus then into one disc when an incorrect selection has been made, i.e., where there is no alignment of cut-out portions in the underlying disc, prevents the stylus from activating or completing an electrical circuit. When the elements are properly aligned, the pointed end of the stylus may be inserted by the user through the cut-out portions of both discs to contact an underlying conductive material, completing an electrical circuit and activating the signal.

Figure 1:
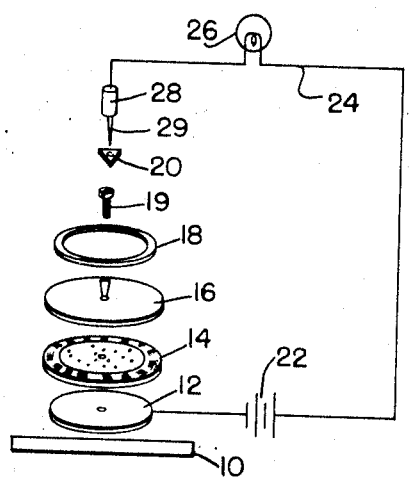
FIG. 1 is a schematic, exploded view of one embodiment of my teaching device.
Figure 2:
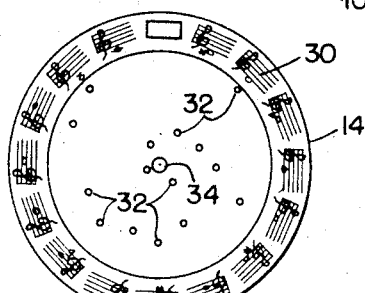
FIGS. 2, 3, 4a and 4b show various portions of the device shown in FIG. 1.
Figure 3:
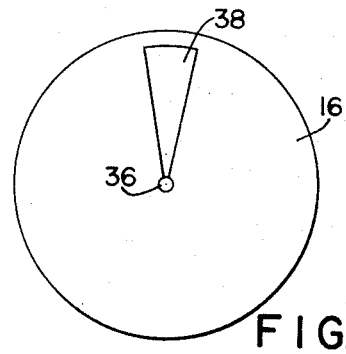

FIG. 1 shows a schematic and exploded view of one embodiment of my teaching device which comprises in combination a flat base 10 on which is mounted a thin, flat disc of conductive material 12, a first paper disc 14, a filler paper disc 16 and a second paper disc 18. Discs 14 and 18 are mounted on the base by a common pivot pin 19 for independent rotatable movement with respect to each other. A reference point or marker 20 is affixed to the base directly outside the periphery of the larger diameter first disc 14. The conductive material 12 forms a part of an electrical circuit which includes a power supply 22, a signal light 26, a stylus 28 having an insulated handle, and an elongated conductive stylus shaft 29 in electrical series communication with and through circuit wire 24.

Figure 4A:
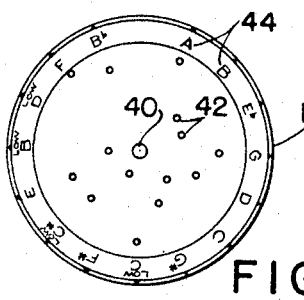
Figure 4B:
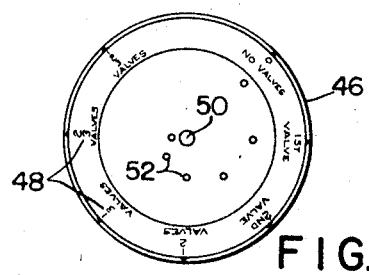

The second disc 18 is superimposed on the first disc 14 with each disc capable of being rotated separately and independently of the other by the user. Each flat disc 14 and 18 contains a series of small, spaced cut-out portions 32, 42 and 52 which are located in the inner portion of the disc, with each cut-out in each respective disc on a series of concentric circles extending from the center of each disc. The cut-out portions are sufficiently large to permit the insertion therethrough of the pointed end of the stylus 29. Each disc contains about a narrow ring portion of its outer periphery music information, the relationship of which is to be learned by the user of the device. In music teaching devices this information 30, 44 and 48 may be shown as musical notes, symbols, syllables, instrument fingerings, or the like. For example, as shown the disc 14 contains musical symbols while the smaller diameter discs 18 and 46 contain instrument fingerings and musical notes which would correspond to the musical symbols. The cut-out portions on the disc are placed to reflect the correct answer or corresponding music information for every musical note, symbol or fingering or other information that would appear in a radial straight line from the cut-out portion about the peripheral edge. The cut-out portions are so located that when different size circles are made in the discs no two cut-out portions in the same disc would be within the same circle. As is apparent, information such as questions and answers, as well as proper fingering for a particular instrument like a brass, woodwind, string or chord instruments may be placed on the discs. The reference point 20 provides a fixed marker on the base to which the user may rotate his selection of music information on each disc. As shown, the larger diameter disc 14 contains a greater number of cut-out portions than the superimposed smaller diameter disc 18. This arrangement provides that a number of small diameter discs may be used in combination with the disc 14 such as, for example, either or both of FIGS. 4a or 4b. FIG. 4b shows a disc 46 similar to disc 18 of FIG. 4a including a center hole 50, information 48 and cut-out portions 52.

Beneath the cut-out portions of disc 14 is shown a fixed conductive sheet material such as thin copper or aluminum foil. This conductive material may be affixed to the non-conductive base 10 by adhesive or other means, and forms a part of the electrical signalling circuit. If desired a fixer filler disc 16 may be inserted, as shown, between the discs 14 and 18. A filler disc 16 is characterized by a center hole 36 for the insertion of the pivot pin 19 and a narrow, elongated, fan-like slot 38 extending outwardly along the radii to near the outer edge of the disc. This disc 16 is fixed so that the slot remains in line with the reference marker 20. As shown, the outer top portion of the slot 38 may be made sufficiently wide to permit one piece of music information 30 on the disc 14 to be visually observable to the user. The purpose of this disc is to prevent the user from attempting to select the proper matching of information on discs 14 and 18 by observing and aligning the cut-out portions of the superimposed discs rather than in using his knowledge in selecting the information to be matched.

In operation the user rotates the discs 14 and 18 so that the music information 30 on disc 14 as selected may be matched with the correct music information 44 on disc 18 at the reference marker 20. The music information 30 is usually first displayed to the user through the top portion of slot 38 in disc 16. The user rotates the smaller diameter discs 18 or 46 to match the correct information with the displayed information. After selection by the user the correctness of the selection is tested by inserting the elongated, electrically conductive, pointed stylus probe 29 into the exposed cut-out portions 42 or 52 of the disc 18 or 46 through the elongated slot 38 and into the cut-out portions 32 of the disc 14. The proper matching of information permits the probe 29 to pass through the aligned cut-out portion of each disc and to make contact with the conductive sheet material 12, whereby the electrical circuit is completed and the light 26 will be activated. Failure of the user to select the proper matching information will result in a non-alignment of the cut-out portions of the disc and prevent the stylus probe 29 from touching the underlying conductive material 12.

FIG. 5 is a perspective view of a music teaching device of one preferred embodiment of a music teaching device of my invention. This device coordinates the teaching of music reading with music notes and instrument fingering. This device functions in principle as the device described in FIGS. 1–4, but constitutes a more permanent and sophisticated teaching device with a rotatable turntable and inner disc upon which replaceable flat sheet material containing the information are to be placed. FIG. 5 is a representative illustration of a device employing on each disc and turntable musical symbol information, while one side gives instrument fingerings and the other opposite side employs musical notes as the matching information to be selected by the user.

FIGS. 6 through 12 show a base 100 characterized by a circular depression 126 therein into which is mounted for rotatable movement about a common center pin 114, a turntable 102 and a disc 104. The turntable 102 is characterized by a circular depressed area 138 with a raised, flat, ring-like peripheral area 142, the latter surface of which is alinged with the top surface of the base. The circular depressed area 138 is characterized by a series of small, spaced cut-out portions 136 arranged in concentric circles about a common center bushing 110. For illustrative purposes the cut-out portions 136 are shown placed on concentric circles in FIG. 8. The position and number of cut-out portions may vary as desired provided the portions of each element don't overlap incorrectly, but generally the number will correspond to the amount of information on the sheet material. A raised, rectangular finger grip 140 is located on the top ring surface, which serves as a reference point for the insertion onto the rotatable turntable 102 of a flat paper ring 122 containing music information 146 with a correspondingly sized slot 160 slightly longer than the grip 140. In addition, the raised section 140 provides the user with an easy means to rotate the turntable 102.

Snugly fitted within the circular depressed area 138 of the turntable 102 is a rotatable disc 104 characterized by a center bushing 112 through which the pivot pin 114 extends, and a fan-like, elongated slot 152 extending from the center outwardly to approach the edge of the disc. The elongated slot 152 need only be sufficiently wide to cover the cut-out portions which are to be aligned by the user, since no display purpose need be accomplished by this opening as in the previous embodiment. A small diameter paper disc 124 contains music information such as instrument fingering on the outer ring portion thereof 148, while the inner circular portion thereof is characterized by a series of spaced cut-out portions 144. The number of cut-out portions 144 should correspond with the amount of music information 148 displayed in the outer ring, while the cut-out portions 136 of turntable 102 may contain a larger number of cut-out portions. The paper disc 124 is characterized by a slotted center hole 150 for proper location and turning of the paper disc about the pin 114 and disc 104. The turntable 102 and the disc 104 are mounted for rotatable movement through a center pivot pin 114 containing a top serrated gripping portion for use by the user in rotating the disc 104, a shaft portion 106 extends through the bearings 112 and 110 and 108, while the flange portion contains characteristic flared and raised stops 118 which match the cut-outs in the center portion 150 of the paper disc used on the disc 104.

The electrical circuit is similar to that described in FIGS. 1–4. The depressed area 126 of the base 100 contains flat, nylon rings mounted to provide peripheral support and a slidable friction top surface for the rotating turntable 102. The base also contains a signal light 130 and a reference point 132 about which are the words "match here". A thin, fan-like conductive material 128 is provided directly beneath the reference point and between the reference point and the center bearing 108.

In operation the paper disc 122 is placed on the ring surface 142 of the turntable 102 and the circular paper disc 124 keyed and inserted on the surface of the rotatable disc 104. The user then rotates either or both discs or the paper disc 124 by aid of handle 114, so that the appropriate music information on the turntable ring 142 is properly aligned at the reference point 132 with the music information 148 on the paper disc 124. The selection of information is checked by the user by inserting the pointed end of the stylus 134 through the cut-out portions 144 in disc 124, the elognated slot 152, cut-out portion 136 and into contact with the conductive material 128 to activate the signal light 130 if the information is properly matched. Improper matching of information fails to activate the signal light due to the inability of the stylus probe to contact the material 128.

As is apparent musical notes, symbols, syllables and instrument fingering and other information may be used in my teaching device. My device may be used as a game by one or more persons by employing a set of cards having questions thereon relating to information that may be used. Each question may then have a score assigned to it and the players selecting the proper answer to the question will receive the designated score. In this game the highest score wins the game after one or a number of cards have been used. For the purposes of illustration, only the first and second discs have been described as containing musical information. However, a plurality of three, four or five or more discs may be employed in a superimposed manner, so that a series of correct matching information or answers, perhaps of graduated difficulty, must be selected by the user in order to place all cut-outs in all of the discs in the proper and correct alignment. The user, thus, would have to obtain a series of correct answers before obtaining a proper signal response. A plurality of discs containing information of increasing difficulty or greater difficulty could be employed. The information on my discs may be printed, marked, placed on crayon or chalk-writing surfaces or otherwise displayed. My discs may be fabricated of paper, wood, plastic, metal or the like.

What I claim is:

1. A teaching device which comprises in combination:
   a base;
   a first element and a second element superimposed thereon, each element mounted on the base, each element independently moveable with respect to each other, each element containing some information to be matched with matching information on the opposite element, and each element characterized by a plurality of cut-out portions therein placed in a predetermined spaced manner, the cut-out portions so arranged that when the information on one element is properly matched with the information on the other element the cut-out portions on each element are properly aligned, but will not otherwise become aligned;
   said first and second elements are circular disc elements with the second element of smaller diameter and superimposed on the first element, so that the information on each element is displayed complementary and adjacent to the information on the other element; each element being mounted for independent rotatable movement about a common center;
   a conductive material disposed in alignment with the cut-out portions when properly aligned; and
   an electrical signal means which includes an electrical probe means which may be inserted into and through the spaced cut-out portions of the first and second elements when properly aligned whereby upon selection by the user of the correct matching information, the user may test the correctness of his selection by insertion of the probe through the aligned cut-out portions and into contact with the conductive material to activate the signal means.

2. The device of claim 1 wherein said first disc element includes a turntable characterized by a raised, flat peripheral ring area and a central circular depressed area; said second disc element being mounted within the depressed area of said turntable and characterized by an elongated, radially extending opening therein with the top surface of said second disc element and said peripheral ring area in substantial alignment, said first disc element including a flat sheet material ring containing information to be displayed placed on the ring area of the turntable, and said second disc element including flat, circular sheet material containing some corresponding information to be matched with the information on the first element on the disc surface, the turntable and sheet material mounted on a common center for independent rotatable movement with respect to each other and to any common reference point on the base.

3. The device of claim 2 wherein the turntable is characterized by a plurality of spaced cut-out portions in the circular depressed area, with the circular sheet material on said second disc element containing a plurality of spaced cut-outs therein, said first and second discs being rotatable to a reference point and conductive material in the electrical signal means located directly below said radially extending opening of the disc whereby on matching the correct information the cut-out portions of the turntable and the sheet material will be properly aligned with the intervening slotted opening of the disc at a reference point.

4. The music teaching device of claim 1 wherein the first and second elements are thin, flat paper discs mounted on a common center for independent rotary movement with respect to each other, one element being smaller in diameter than the other element and superimposed thereon, and which includes means interposed between the discs whereby the user is prevented from aligning the cut-out portions of each disc element without reference to the information displayed on each element.

5. The device of claim 1 which includes means interposed between the first and second elements to prevent the user from visually aligning the cut-out portions of each element without matching the information on the elements.

6. The music teaching device of claim 1 wherein:
   the first and second elements are flat circular discs, the first element is smaller in diameter than the second element and is superimposed on the second element, each element mounted for independent rotatable movement on a common center on the base;
   the first and second elements separated by a fixed intervening solid element and mounted on the common center and characterized by an elongated fan-shaped slot extending from about the center to the outer margin thereof;
   a reference marked on the base;
   the fan-shaped slot of the fixed element aligned with the marker to display music information from the first and second elements in the upper portion of the slot and to permit access to the cut-out portions aligned with such information, the music information of the first and second elements displayed on an outer ring portion of each disc, with the cut-out portions placed on different concentric circles on the inner area of each element.

References Cited

UNITED STATES PATENTS

| 1,453,100 | 4/1923 | Fulgora | 235—88 |
| 3,233,340 | 2/1966 | Brown | 35—9 |

FOREIGN PATENTS 442,572  9/1912  France.

RICHARD B. WILKINSON, *Primary Examiner.*

G. M. POLUMBUS, *Assistant Examiner.*

U.S. Cl. X.R.

84—474